(12) United States Patent
Yeoh et al.

(10) Patent No.: US 10,118,281 B2
(45) Date of Patent: Nov. 6, 2018

(54) IMPACT DRIVER HAVING AN IMPACT MECHANISM

(71) Applicant: Robert Bosch GmbH, Stuttgart (DE)

(72) Inventors: Sim Teik Yeoh, Gelugor Penang (MY); Siew Yuen Lee, Pulau Pinang (MY)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/591,800

(22) Filed: May 10, 2017

(65) Prior Publication Data

US 2017/0239792 A1  Aug. 24, 2017

Related U.S. Application Data

(62) Division of application No. 13/936,901, filed on Jul. 8, 2013.

(30) Foreign Application Priority Data

Jul. 9, 2012 (DE) .......................... 10 2012 211 907

(51) Int. Cl.
  *B25B 21/02* (2006.01)
  *B23B 31/12* (2006.01)

(52) U.S. Cl.
  CPC .......... *B25B 21/02* (2013.01); *B23B 31/1246* (2013.01)

(58) Field of Classification Search
  None
  See application file for complete search history.

(56) References Cited

U.S. PATENT DOCUMENTS

| | | | |
|---|---|---|---|
| 4,682,918 A * | 7/1987 | Palm | B23B 31/123 279/60 |
| 4,702,485 A | 10/1987 | Rohm | |
| 4,824,298 A | 4/1989 | Lippacher et al. | |
| 4,958,840 A | 9/1990 | Palm | |
| 5,172,923 A | 12/1992 | Nakamura | |
| 5,882,153 A | 3/1999 | Mack et al. | |
| 7,243,922 B2 | 7/2007 | Gibbons | |
| 8,322,457 B2 | 12/2012 | Mok et al. | |
| 8,794,348 B2 | 8/2014 | Rudolph | |
| 2001/0035292 A1 | 11/2001 | Bieber et al. | |
| 2003/0173097 A1 | 9/2003 | Holzer et al. | |
| 2006/0185870 A1 | 8/2006 | Gehret et al. | |
| 2006/0244223 A1* | 11/2006 | Zhou | B23B 31/123 279/62 |

(Continued)

FOREIGN PATENT DOCUMENTS

| | | |
|---|---|---|
| CN | 1457949 A | 11/2003 |
| CN | 1535782 A | 10/2004 |

(Continued)

*Primary Examiner* — Hemant M Desai
*Assistant Examiner* — Tanzim Imam
(74) *Attorney, Agent, or Firm* — Norton Rose Fulbright US LLP; Gerard Messina

(57) ABSTRACT

In an impact driver including an impact mechanism for percussive driving of an output drive shaft on which is provided a tool receptacle for receiving an inserted tool, the tool receptacle is embodied as a clamping chuck, a permanent connection being embodied between the clamping chuck and the output drive shaft in order to prevent at least tool-free detachment of the clamping chuck from the output drive shaft.

8 Claims, 9 Drawing Sheets

(56) References Cited

U.S. PATENT DOCUMENTS

| | | |
|---|---|---|
| 2007/0200302 A1 | 8/2007 | Cachod |
| 2008/0073092 A1 | 3/2008 | Yeoh et al. |
| 2008/0308286 A1* | 12/2008 | Puzio ................ B25B 21/00 173/210 |
| 2009/0114410 A1 | 5/2009 | Van Der Linde et al. |
| 2010/0071923 A1* | 3/2010 | Rudolph ............. B25B 21/00 173/48 |
| 2010/0193207 A1* | 8/2010 | Mok ................ B23B 31/1238 173/48 |
| 2010/0326686 A1* | 12/2010 | Leong ............... B25B 21/00 173/48 |
| 2011/0000692 A1 | 1/2011 | Roehm |
| 2011/0147023 A1 | 6/2011 | Herr |
| 2012/0152577 A1* | 6/2012 | Mattson ............. B25D 17/02 173/1 |
| 2012/0292065 A1 | 11/2012 | Hoshi et al. |

FOREIGN PATENT DOCUMENTS

| | | |
|---|---|---|
| CN | 1541795 A | 11/2004 |
| CN | 1853869 A | 11/2006 |
| CN | 201102080 Y | 8/2008 |
| DE | 20 2006 014 850 U1 | 11/2006 |
| GB | 2 471 373 A | 12/2010 |

* cited by examiner

IMPACT DRIVER HAVING AN IMPACT MECHANISM

CROSS REFERENCE TO RELATED APPLICATIONS

The present application is a divisional application of U.S. patent application Ser. No. 13/936,901, filed Jul. 8, 2013, which claims priority to and the benefit of German Patent Application No. 10 2012 211 907.8, which was filed in Germany on Jul. 9, 2012, the contents of each of which are hereby incorporated by reference in their entireties.

FIELD OF THE INVENTION

The present invention relates to an impact driver having an impact mechanism for percussive driving of an output drive shaft on which is provided a tool receptacle for receiving an inserted tool.

BACKGROUND INFORMATION

German patent document DE 20 2006 014 850 U1 discusses an impact driver of this kind that has a tool receptacle, equipped with a polygonal internal receptacle, that is provided on an output drive shaft percussively drivable by an associated impact mechanism. The polygonal internal receptacle is connectable to an inserted tool of the so-called hex type, e.g. a screwdriver bit, that has an external polygonal coupling that corresponds to the polygonal internal receptacle, has a hexagonal cross section, and is equipped e.g. with an external annular groove embodied in accordance with DIN 3126-E6.3.

The existing art is disadvantageous in that such impact drivers are limited to the use of inserted tools of the hex type. For the case in which a user wishes to use inserted tools that are embodied in accordance with other inserted tool types, for example inserted tools of the so-called SDS type or round shank type, he or she must then possess a respective separate hand-held power tool suitable therefore, and must use it as necessary instead of the impact driver. This on the one hand necessitates corresponding procurement costs on the part of the user, and on the other hand can result in loss of utilization convenience during operation of an impact driver of this kind, as a result of the exchange of tools required in each case.

SUMMARY OF THE INVENTION

An object of the present invention is thus to make available a novel impact driver that is usable with a plurality of inserted tools embodied in accordance with different inserted-tool types.

This problem is solved by an impact driver having an impact mechanism for percussive driving of an output drive shaft on which is provided a tool receptacle for receiving an inserted tool. The tool receptacle is embodied as a clamping chuck, a permanent connection being embodied between the clamping chuck and the output drive shaft in order to prevent at least tool-free detachment of the clamping chuck from the output drive shaft.

The present invention thereby makes it possible to provide an impact driver in which, thanks to the use of a tool receptacle embodied in the manner of a clamping chuck, utilization of a plurality of inserted tools embodied in accordance with different inserted tool types is enabled, for example inserted tools of the hex, SDS, and/or round shank type, etc.

The impact mechanism may be embodied in the manner of a mechanical impact mechanism having a spring-loaded impact member that is equipped with at least one input drive cam, the output drive shaft having at least one output drive cam.

Provision of an impact driver having a robust and compact impact mechanism can thereby be enabled.

According to an embodiment, the output drive shaft has at least one axial internal recess equipped with an internal thread.

The present invention thereby makes it possible to provide a simple and economical first fastening element on the output drive shaft for fastening the clamping chuck.

In addition or alternatively thereto, an external thread can be embodied on the external periphery of the output drive shaft.

The present invention thereby allows a simple and economical second fastening element to be made available on the output drive shaft for fastening the clamping chuck.

The internal thread and the external thread may have counterdirectional screw threads.

It is thereby possible to provide on the output drive shaft, in simple fashion, fastening elements acting in opposite rotation directions for nonrotatable fastening of the clamping chuck.

The clamping chuck may have a clamping chuck body equipped with an axial passthrough opening, the axial passthrough opening being equipped for passage of a screw equipped with an external thread and the external thread of the screw being embodied for thread-joining to the internal thread of the output drive shaft.

It thereby becomes possible to make available an impact driver in which the clamping chuck body is fastened in permanently secure and stable fashion on the output drive shaft.

Alternatively or additionally thereto, the clamping chuck body can have an internal thread, the internal thread being embodied for thread-joining to the external thread of the output drive shaft.

Robust and reliable permanent fastening, acting in opposite rotation directions, of the clamping chuck on the output drive shaft is thereby made possible.

According to an embodiment, the output drive shaft is embodied in at least two pieces and has an output drive stud as well as a cam member equipped with at least one output drive cam, the output drive stud being fastened via a rigid connection on the clamping chuck and being connected nonrotatably to the cam member.

The present invention thereby makes possible the provision of an impact driver in which simplified installation of the clamping chuck and improved concentricity properties are made possible by dividing the output drive shaft in two.

The output drive stud may have, at its axial end connected to the cam member, a rotationally entrained member that engages in rotationally secured fashion into a rotationally entraining member correspondingly embodied on the cam member.

A stable and secure connection between the output drive stud and cam member can thereby be made possible.

The rotationally entrained member may be embodied in the manner of a polygonal contour on the external periphery of the output drive stud, and the rotationally entraining member is provided in the manner of a polygonal opening on the cam member.

The connection between output drive stud and cam member can thereby be embodied, in uncomplicated and economical fashion, in the manner of a positive engagement.

The cam member may be fastened on the output drive stud via a securing member.

Undesired detachment of the output drive stud from the cam member can thereby be securely and reliably prevented.

According to an embodiment, the securing member is disposed on a side of the cam member facing toward the impact member.

The present invention thereby makes it possible to provide an impact driver in which a comparatively small and economical securing member is sufficient for rotationally secured fastening of the output drive stud on the cam member.

According to an embodiment, the securing member is disposed on a side of the cam member facing away from the impact member.

The present invention thereby makes it possible to provide an impact driver in which a comparatively larger securing member is used for improved rotationally secured fastening of the output drive stud on the cam member.

The securing member may be embodied in the manner of a securing ring that is disposed in an annular groove provided on the output drive stud.

The securing member can thereby be permanently fastened on the output drive stud in a simple manner.

According to an embodiment, the output drive shaft embodies a rotationally entraining member.

The present invention thereby makes it possible to provide an impact driver in which rotational entrainment of the clamping chuck is made possible in simple fashion.

The clamping chuck may have a clamping chuck body that embodies a rotationally entrained member, into which the rotationally entraining member embodied on the output drive shaft engages in rotationally secured fashion.

Robust and reliable rotational entrainment of the clamping chuck can thereby be enabled.

According to an embodiment, the output drive shaft has at least one radial passthrough opening.

The present invention thereby enables the provision of a simple and economical capability for fastening the clamping chuck on the output drive shaft.

A radial opening oriented in alignment with the radial passthrough opening of the output drive shaft may be provided on the clamping chuck body.

Stable, permanent fastening of the clamping chuck body on the output drive shaft is thereby made possible.

For rotationally secured fastening of the clamping chuck body on the output drive shaft, an at least locally peg-shaped securing member may be disposed in the radial passthrough opening of the output drive shaft and at least locally in the radial opening of the clamping chuck body.

Robust and uncomplicated permanent fastening of the clamping chuck body on the output drive shaft is thereby achieved.

An O-shaped securing ring may be disposed in the region of the peg-shaped securing member on the clamping chuck body in order to immobilize the peg-shaped securing member in the radial opening of the clamping chuck body and in the radial passthrough opening of the output drive shaft.

It is thereby possible to achieve, in simple fashion, secure and reliable immobilization of the peg-shaped securing member in the radial opening of the clamping chuck body and in the radial passthrough opening of the output drive shaft.

The present invention is explained in further detail in the description below with reference to exemplifying embodiments depicted in the drawings.

DETAILED DESCRIPTION

Figure 1:
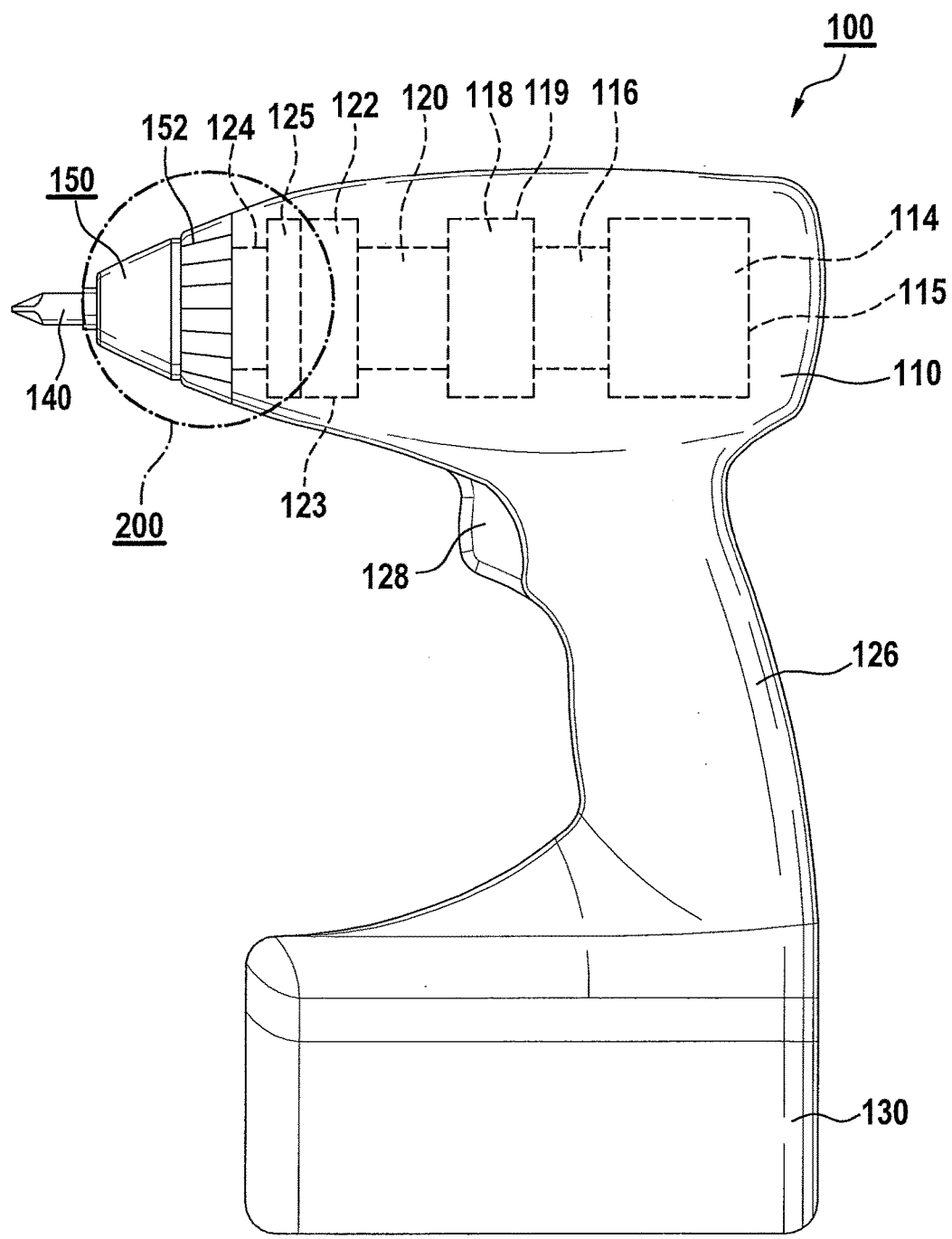
FIG. 1 is a schematic view of an impact driver having an impact mechanism according to an embodiment.

FIG. 1 shows an exemplifying impact driver 100 that is equipped with a tool receptacle 150 and an impact mechanism 122 and has a housing 110 having a handle 126. According to an embodiment, impact driver 100 is mechanically and electrically connectable to a rechargeable battery pack 130 for cordless power supply.

Impact driver 100 is embodied by way of example as a rechargeable battery-operated impact driver. Be it noted, however, that the present invention is not limited to rechargeable battery-operated impact drivers, but instead can be applied very generally to impact drivers regardless of whether they are drivable electrically, i.e. in cordless fashion with a rechargeable battery pack or in line-connected fashion, or non-electrically.

An electric drive motor 114 supplied with power from rechargeable battery pack 130, a gearbox 118, and impact mechanism 122 are disposed illustratively in tool housing 110. Drive motor 114 can be actuated, for example, via a manual switch 128, i.e. switched on and off, and can be of any motor type, e.g. an electronically commutated motor or a DC motor. By preference, drive motor 114 is electronically controlled or regulated in such a way that both a reverse mode and also stipulations with regard to a desired rotation speed can be implemented. The construction and mode of operation of a suitable drive motor are sufficiently known from the existing art, and in the interest of a concise and simple description are therefore not further described here.

Drive motor 114 is connected via an associated motor shaft 116 to gearbox 118, which converts a rotation of motor shaft 116 into a rotation of a drive member 120, e.g. an input drive shaft, provided between gearbox 118 and impact mechanism 122. This conversion may occur in such a way that input drive shaft 120 rotates relative to motor shaft 116 with increased torque but at a decreased rotation speed. Drive motor 114 is disposed illustratively in a motor housing 115, and gearbox 118 is disposed in a gearbox housing 119;

gearbox housing 119 and motor housing 115 are disposed, by way of example, in tool housing 110. Be it noted, however, that alternatively thereto, drive motor 114 and gearbox housing 118 can also be disposed, for example, directly in tool housing 110, e.g. for the case in which impact driver 100 is embodied using a so-called "open frame" configuration.

Impact mechanism 122 connected to drive member 120 is, by way of example, a rotary or rotational impact mechanism that is equipped with an impact member 125 and generates high-intensity rotary percussive pulses and transfers them via impact member 125 to output drive shaft 124, for example an output drive spindle. Illustratively, impact mechanism 122 is disposed in an associated impact mechanism housing 123, but alternatively thereto can also be disposed in another suitable housing, e.g. in gearbox housing 119 or in tool housing 110.

Impact mechanism 122 may be embodied in the manner of a mechanical impact mechanism for percussively driving output drive shaft 124, in which impact member 125 is, for example, disposed longitudinally displaceably and at least partly rotationally movably on input drive shaft 120 and is spring-loaded there in the direction of output drive shaft 124. An exemplifying mechanical impact mechanism with which impact mechanism 122 can be implemented is described in DE 20 2006 014 850 U1, to which reference is expressly made here and whose teaching is to be understood as part of the present description, so that a detailed description of impact mechanism 122 can be omitted here in the interest of a concise description.

Tool receptacle 150, embodied for reception of an inserted tool 140, is provided by way of example on output drive shaft 124. This receptacle is embodied illustratively as a clamping chuck equipped with a clamping sleeve 152, and is therefore also referred to hereinafter as "clamping chuck 150." According to an embodiment, a permanent connection is embodied between this clamping chuck 150 and output drive shaft 124 in order to prevent at least tool-free detachment of clamping chuck 150 from output drive shaft 124.

In the context of the present invention the term "permanent" means that no provision is made for removal of clamping chuck 150 from impact driver 100 by a user, and clamping chuck 150 is thus an integral constituent of impact driver 100. While replacement of clamping chuck 150 can in principle be possible, for example in order to avoid acquisition of an entirely new impact driver following damage, but at least not in tool-free fashion and may be not without opening tool housing 110. In other words, in the context of the present invention the term "permanent" therefore means that clamping chuck 150 is the principal tool receptacle of impact driver 100 and is not connected to impact driver 100 in the form of a detachable or exchangeable adapter or tool attachment.

An enlarged portion 200 of impact driver 100 is described below with reference to FIGS. 2, 4, 6, and 8, with differently embodied clamping chucks that can each be utilized to implement clamping chuck 150. In the interest of a simplified and concise description, identical or identically functioning parts are in each case labeled with identical reference characters and, in principle, described only once.

Figure 2:
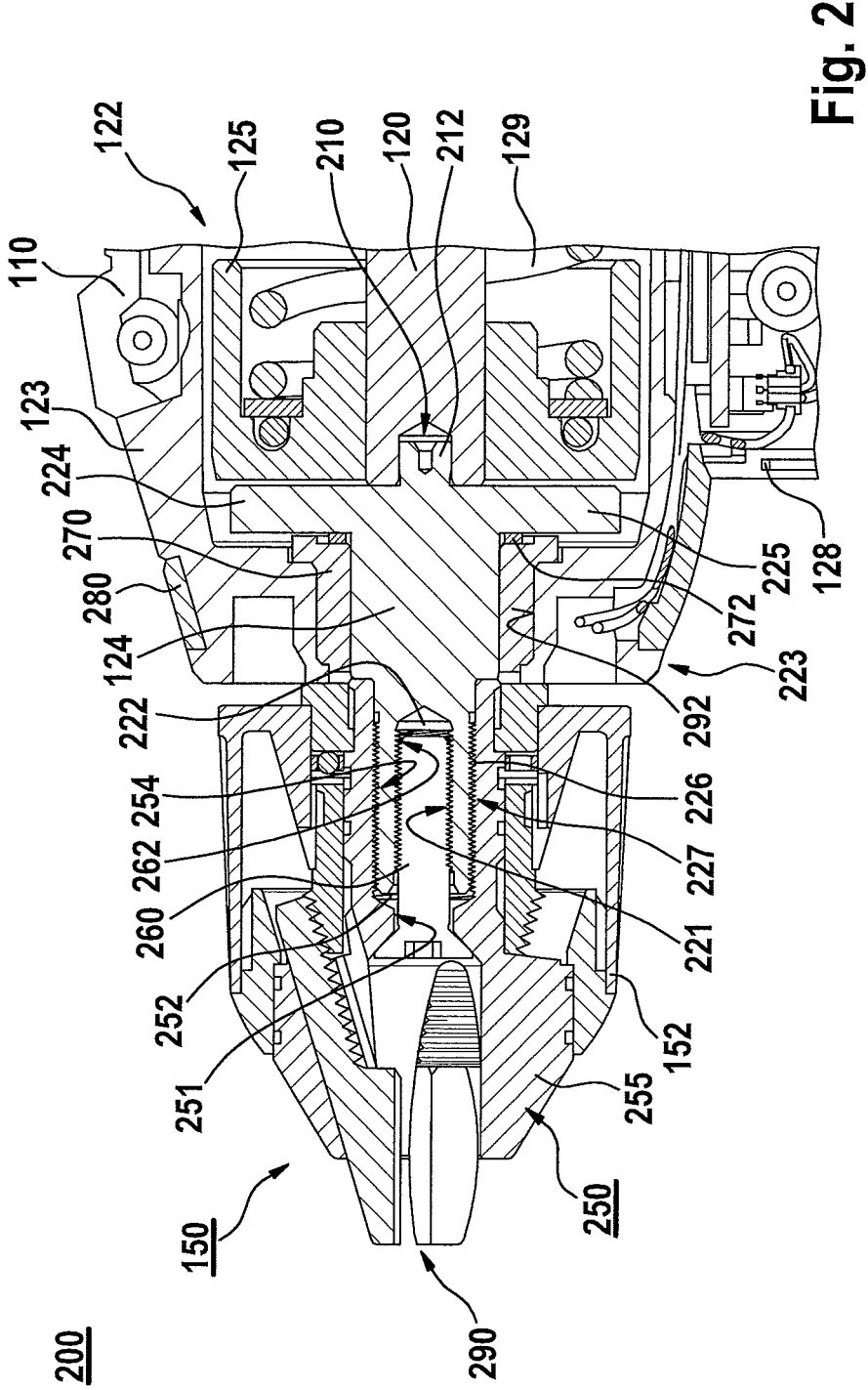
FIG. 2 is a sectioned view of a portion of the impact driver of FIG. 1 having a tool receptacle according to a first embodiment.

FIG. 2 shows portion 200 of impact driver 100 of FIG. 1 with an exemplifying clamping chuck 250 which is connected to output drive shaft 124 of FIG. 1 and with which clamping chuck 150 of FIG. 1 can be implemented in accordance with a first embodiment. Portion 200 elucidates, by way of example, the fastening of impact mechanism housing 123 on tool housing 110 equipped with manual switch 128, as well as individual components of impact mechanism 122 that is embodied in the manner of a mechanical impact mechanism and is disposed in impact mechanism housing 123. These components encompass impact member 125 that is spring-loaded illustratively by way of a compression spring 129 in the direction of output drive shaft 124 and is equipped with at least one drive cam (325, 326 in FIG. 3) that, by way of example, interacts with at least one output drive cam 224, 225 provided on output drive shaft 124.

Illustratively, output drive shaft 124 is mounted in rotationally movable fashion on input drive shaft 120 via a bearing peg 212 that is embodied at that axial end of the output drive shaft which is associated with input drive shaft 120. Output drive shaft 124 is furthermore, by way of example, mounted in rotationally movable fashion in a bearing element 270 that is disposed in an opening 292 that is provided at an axial end 223 of impact mechanism housing 123 facing toward clamping chuck 250, at which end an external rubber protective cap 280 is furthermore illustratively disposed. Bearing element 270 can in this context be, for example, a bearing sleeve pressed into opening 292 or any other plain or rolling bearing. In addition, a spacer ring 272 is disposed by way of example on output drive shaft 124 in the region between bearing element 270 and output drive cams 224, 225.

Output drive shaft 124 illustratively has at least one axial internal recess 222 equipped with an internal thread 221, and alternatively or additionally thereto an external thread 227 is embodied on external periphery 226 of output drive shaft 124. Internal thread 221 and external thread 227 have, by way of example, counterdirectional screw threads and are provided for fastening clamping chuck 250.

Clamping chuck 250 illustratively has a clamping chuck body 255, equipped with an axial passthrough opening 251, on which an internal thread 254 can be embodied alternatively or additionally to passthrough opening 251. Internal thread 254 is embodied in an internal recess 252 that is provided on clamping chuck body 255 and faces toward axial end 223 of impact mechanism housing 123. Said recess is approximately cup-shaped, having an open axial end region which faces toward axial end 223 of impact mechanism housing 123 and through which output drive shaft 124 engages into internal recess 252, as well as an oppositely located, substantially closed axial end region in which passthrough opening 251 is embodied.

Axial passthrough opening 251 is provided, by way of example, for passage of a screw 260 equipped with an external thread 262. External thread 262 of screw 260 is embodied here for thread-joining to internal thread 221 of output drive shaft 124. Internal thread 254 of clamping chuck body 255 is embodied, by way of example, for thread-joining to external thread 227 of output drive shaft 124. Clamping chuck body 255 of clamping chuck 250 can thus be thread-joined in duplicate fashion, with counterdirectional screw threads, on output drive shaft 124, so that clamping chuck 250 is fastened on output drive shaft 124 in a manner rotationally secured in both rotation directions.

Be it noted that clamping chuck 250 illustratively has clamping sleeve 152 of FIG. 1 as well as clamping jaws 290.

Further characterization of individual components of clamping chuck 250 has, however, been omitted in the interest of a simple and comprehensible drawing. A detailed description thereof can thus also be omitted in the interest of a simple and concise description, since the construction and mode of operation of a clamping chuck are sufficiently known as such to one skilled in the art.

Figure 3:
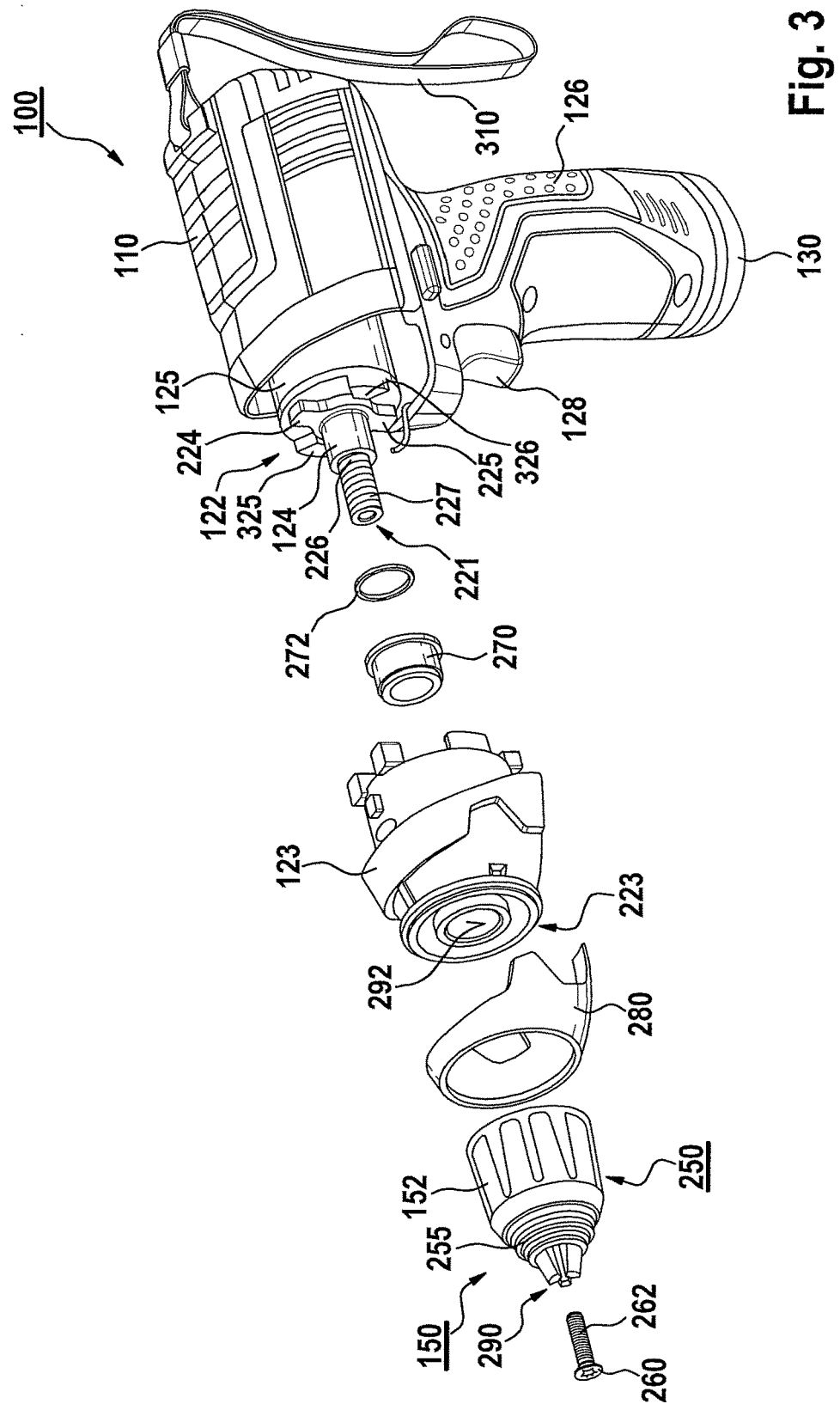
FIG. 3 is a perspective exploded view of the impact driver of FIG. 1 equipped with the tool receptacle of FIG. 2.

FIG. 3 shows impact driver 100 of FIG. 1, equipped with clamping chuck 250 of FIG. 2, in the context of an exemplifying installation of clamping chuck 250 on output drive shaft 124, in order to elucidate an exemplifying configuration of impact mechanism 125, output drive shaft 124, spacer ring 272, bearing bushing 270, impact mechanism housing 123, rubber protective cap 280, clamping chuck 250, and screw 260. Impact driver 100 illustratively has a carrying strap 310, and impact member 125 is illustratively equipped with two output drive cams 325, 326.

Figure 4:
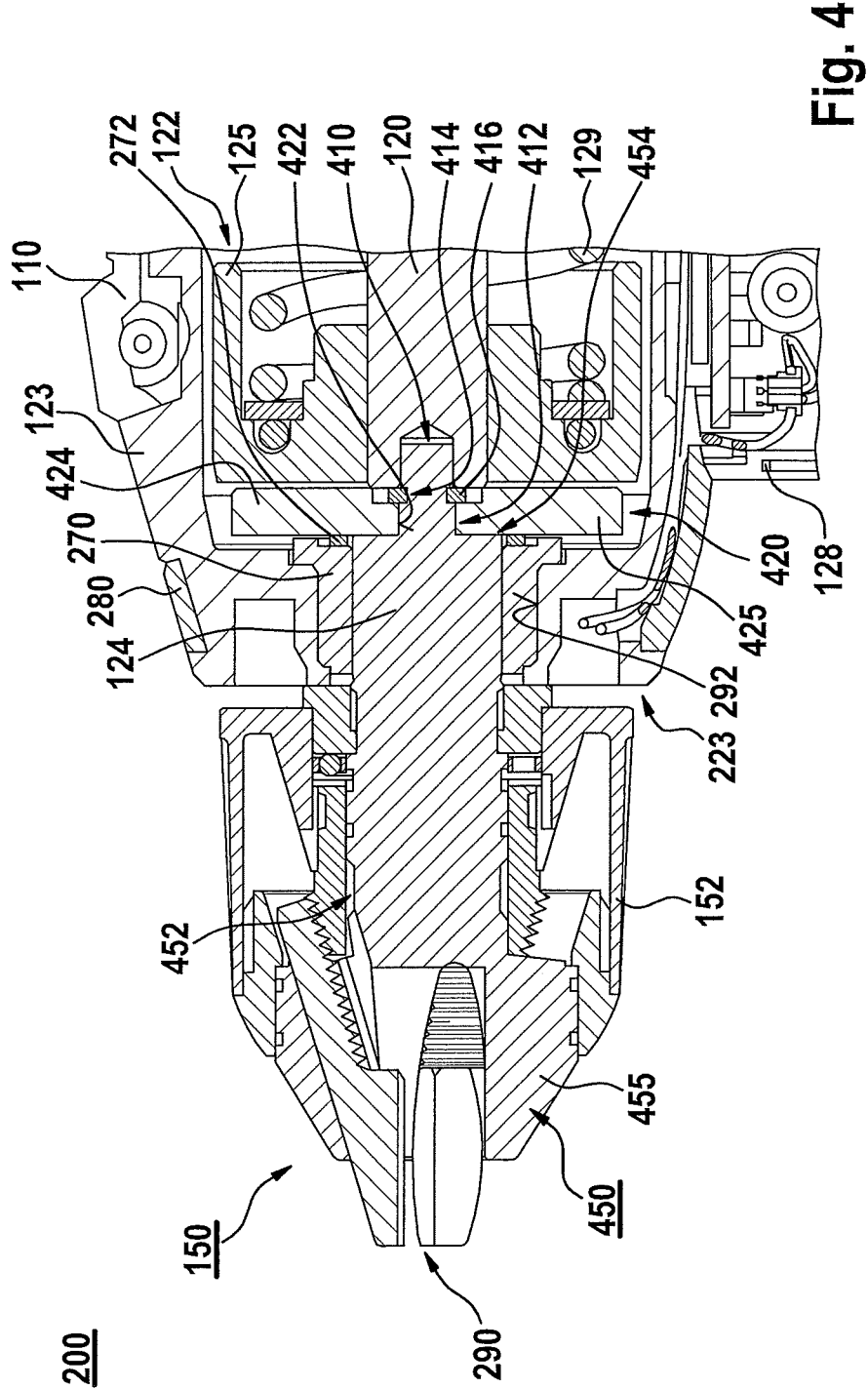
FIG. 4 is a sectioned view of the portion of the impact driver of FIG. 1 having a tool receptacle according to a second embodiment.

FIG. 4 shows portion 200 of impact driver 100 of FIG. 1 with an exemplifying clamping chuck 450 which is connected to output drive shaft 124 of FIG. 1 and with which clamping chuck 150 of FIG. 1 can be implemented in accordance with a second embodiment. Here output drive shaft 124 is embodied by way of example in at least two pieces, and has a cam member 420 that is equipped with at least one, and by way of example with two output drive cams 424, 425 and is connected nonrotatably to an output drive stud 452.

Output drive stud 452 is fastened nonrotatably via a rigid connection to clamping chuck 450 and to clamping chuck body 455 associated therewith, and may be shaped onto them or embodied in one piece with them. Output drive stud 452 is moreover, by way of example, mounted in rotationally movable fashion in bearing bushing 270.

Illustratively, output drive stud 452 tapers at a shoulder 454 abutting against cam member 420 and has, at its tapered axial end connected to cam member 420, a rotationally entrained member 412. The latter is embodied by way of example in the manner of a polygonal contour on the outer periphery of output drive stud 452, and by way of example engages in rotationally secured fashion into a rotationally entraining member 422 embodied correspondingly, and may be in the manner of a polygonal opening, on cam member 420. Output drive stud 452 can thereby be pressed into cam member 420 in order to stabilize the connection. Rotational entrainment of clamping chuck 450 by output drive shaft 124 can thus be brought about by way of a positive engagement embodied between rotationally entraining member 422 and rotationally entrained member 412.

Cam member 420 is fastened on output drive stud 452 illustratively by way of a securing member 416. The latter is embodied, by way of example, in the manner of a securing ring that is disposed in an annular groove 414 provided on output drive stud 452 on a side of cam member 420 (the right in FIG. 4) facing toward impact member 125. Securing ring 416 can moreover also, as illustrated, be disposed in a recess embodied on cam member 420 in order to enable planar abutment of cam member 420 against shoulder 454 of output drive stud 452. Because securing ring 416 is disposed at the tapered axial end 410 of output drive stud 452—which in addition, for connection to cam member 420, is illustratively at least locally mounted in rotationally movable fashion in input drive shaft 120—securing ring 416 can be embodied with a comparatively small diameter.

Be it noted that clamping chuck 450 as well illustratively encompasses clamping sleeve 152 as well as clamping jaws 290 of FIG. 2. Further characterization of individual components of clamping chuck 450 has, however, as in the case of clamping chuck 250 of FIG. 2, been omitted in the interest of a simple and comprehensible drawing.

Figure 5:
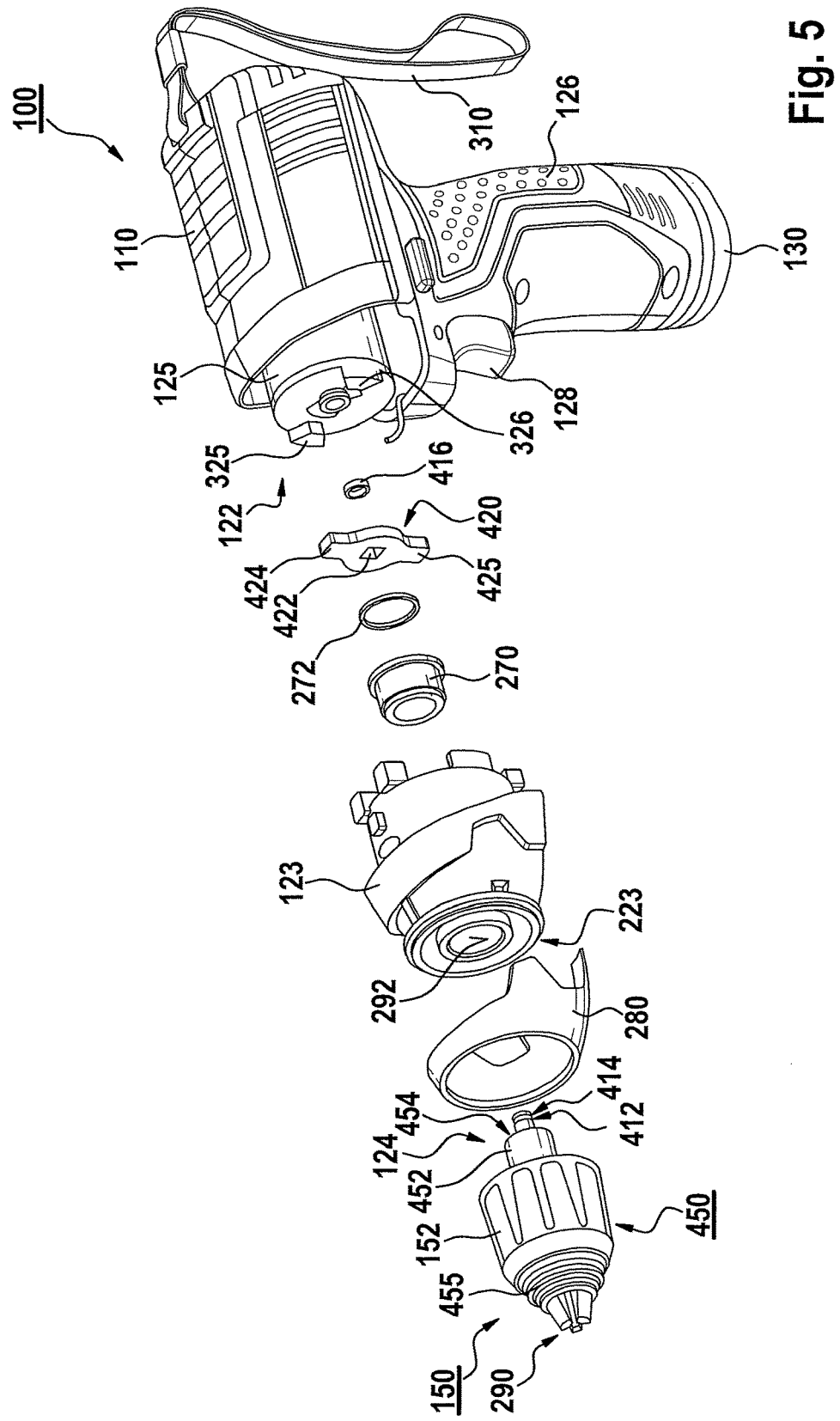
FIG. 5 is a perspective exploded view of the impact driver of FIG. 1 equipped with the tool receptacle of FIG. 4.

FIG. 5 shows impact driver 100 of FIG. 1, equipped with clamping chuck 450 of FIG. 4, in the context of an exemplifying installation of clamping chuck 450 on impact driver 100, in particular to elucidate an exemplifying embodiment of output drive shaft 124, embodied in two pieces, having cam member 420 and having output drive stud 452 provided on clamping chuck 450, and having securing ring 416 embodied with a comparatively small diameter.

Figure 6:
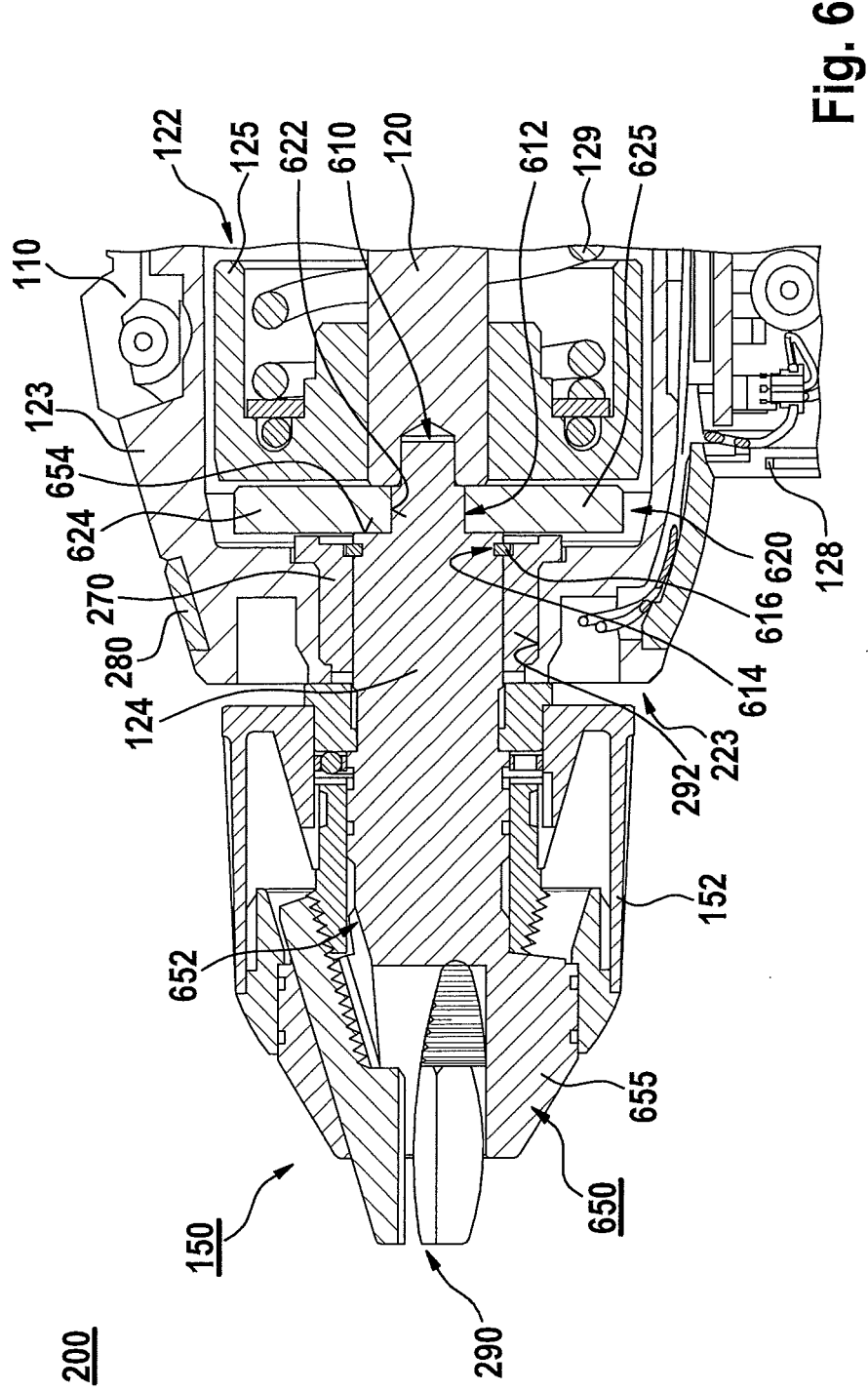
FIG. 6 is a sectioned view of the portion of the impact driver of FIG. 1 having a tool receptacle according to a third embodiment.

FIG. 6 shows portion 200 of impact driver 100 of FIG. 1 with an exemplifying clamping chuck 650 which is connected to output drive shaft 124 of FIG. 1 and with which clamping chuck 150 of FIG. 1 can be implemented in accordance with a third embodiment. Output drive shaft 124 is likewise embodied here, by way of example, in at least two pieces, and has a cam member 620 and an output drive stud 652. Cam member 620 is equipped with at least one, and by way of example with two output drive cams 624, 625 and is connected nonrotatably to output drive stud 652 that is fastened nonrotatably via a rigid connection to clamping chuck 650 and to clamping chuck body 655 associated therewith, and may be shaped onto them or embodied in one piece with them.

Output drive stud 652 is likewise, by way of example, mounted in rotationally movable fashion in bearing bushing 270 and tapers illustratively at a shoulder 654 abutting against cam member 620. Embodied at its tapered axial end 610 connected to cam member 620 is, on the one hand, by way of example an even further tapered region that is mounted at least locally in rotationally movable fashion in input drive shaft 120, and on the other hand by way of example a rotationally entrained member 612 that is embodied e.g. in the manner of a polygonal contour on the external periphery of output drive stud 652 and by way of example engages in rotationally secured fashion into a rotationally entraining member 622 embodied correspondingly, and may be in the manner of a polygonal opening, on cam member 620. Output drive stud 652 can thereby be pressed into cam member 620 in order to stabilize the connection. Rotational entrainment of clamping chuck 650 by output drive shaft 124 can thus be brought about by way of a positive engagement embodied between rotationally entraining member 622 and rotationally entrained member 612.

Cam member 620 is fastened on output drive stud 652 illustratively by way of a securing member 616 embodied in the manner of a securing ring, disposed for that purpose, by way of example, in an annular groove 614 provided on output drive stud 652 on a side of cam member 620 (the left in FIG. 6) facing away from impact member 125. Securing ring 616 can moreover also, as illustrated, be disposed in a recess embodied on bearing bushing 270 in order to enable planar abutment of cam member 620 against bearing bushing 270. Because securing ring 616 is disposed on the non-tapered region of output drive stud 652, securing ring 616 can be embodied with a diameter that is enlarged with respect to securing ring 416 of FIG. 4.

Be it noted that clamping chuck 650 as well illustratively encompasses clamping sleeve 152 as well as clamping jaws 290 of FIG. 2. Further characterization of individual components of clamping chuck 650 has, however, as also in the case of clamping chuck 250 of FIG. 2, been omitted in the interest of a simple and comprehensible drawing.

Figure 7:
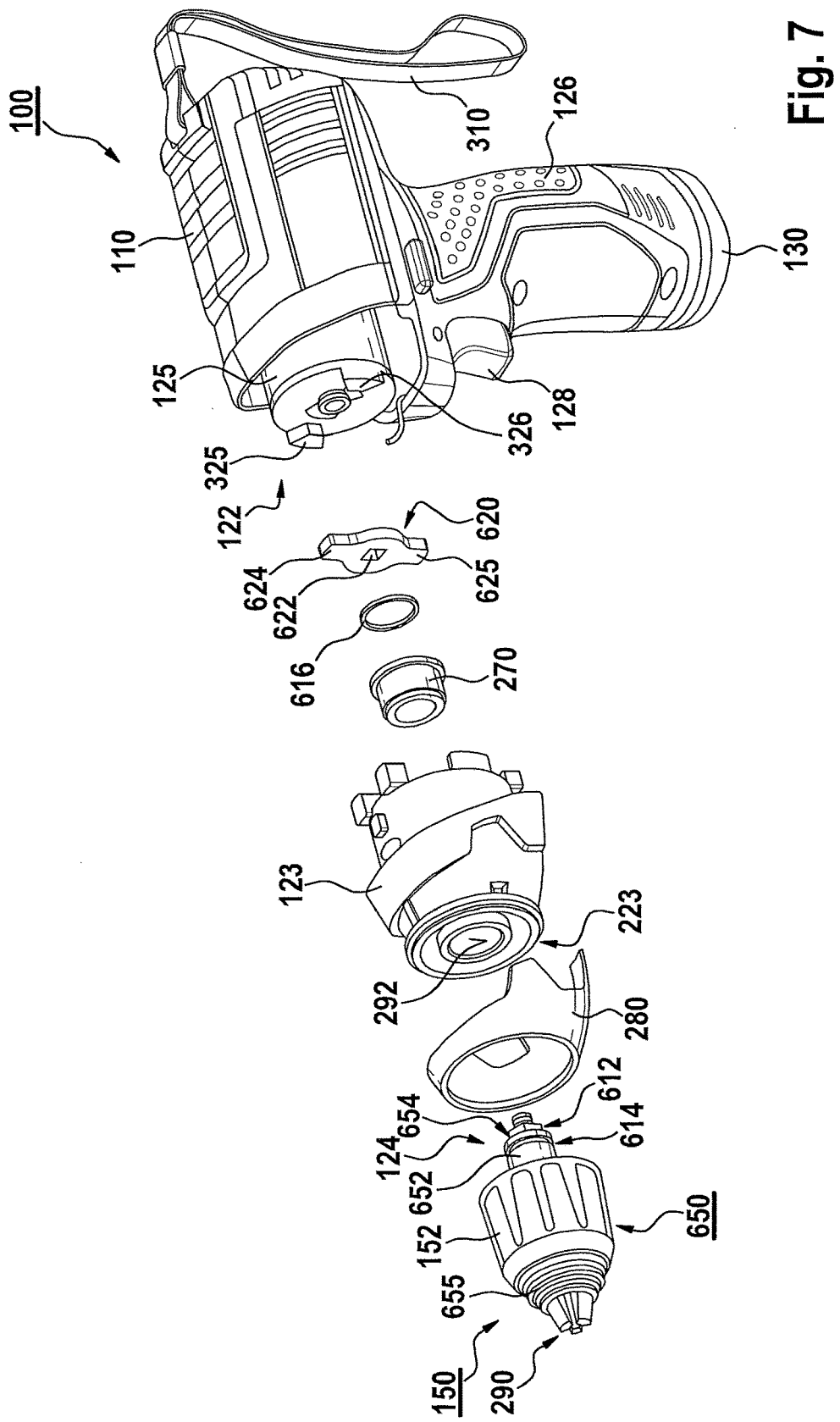
FIG. 7 is a perspective exploded view of the impact driver of FIG. 1 equipped with the tool receptacle of FIG. 6.

FIG. 7 shows impact driver 100 of FIG. 1, equipped with clamping chuck 650 of FIG. 6, in the context of an exemplifying installation of clamping chuck 650 on impact driver 100, in particular in order to elucidate an exemplifying embodiment of output drive shaft 124, embodied in two pieces, having cam member 620 and having output drive stud 652 embodied on clamping chuck 650, and having securing ring 616 embodied with a comparatively enlarged diameter. As compared with FIGS. 4 and 5, said ring replaces spacer ring 272 and securing ring 416 so that here, advantageously, one component can be eliminated as compared with the second embodiment.

Figure 8:
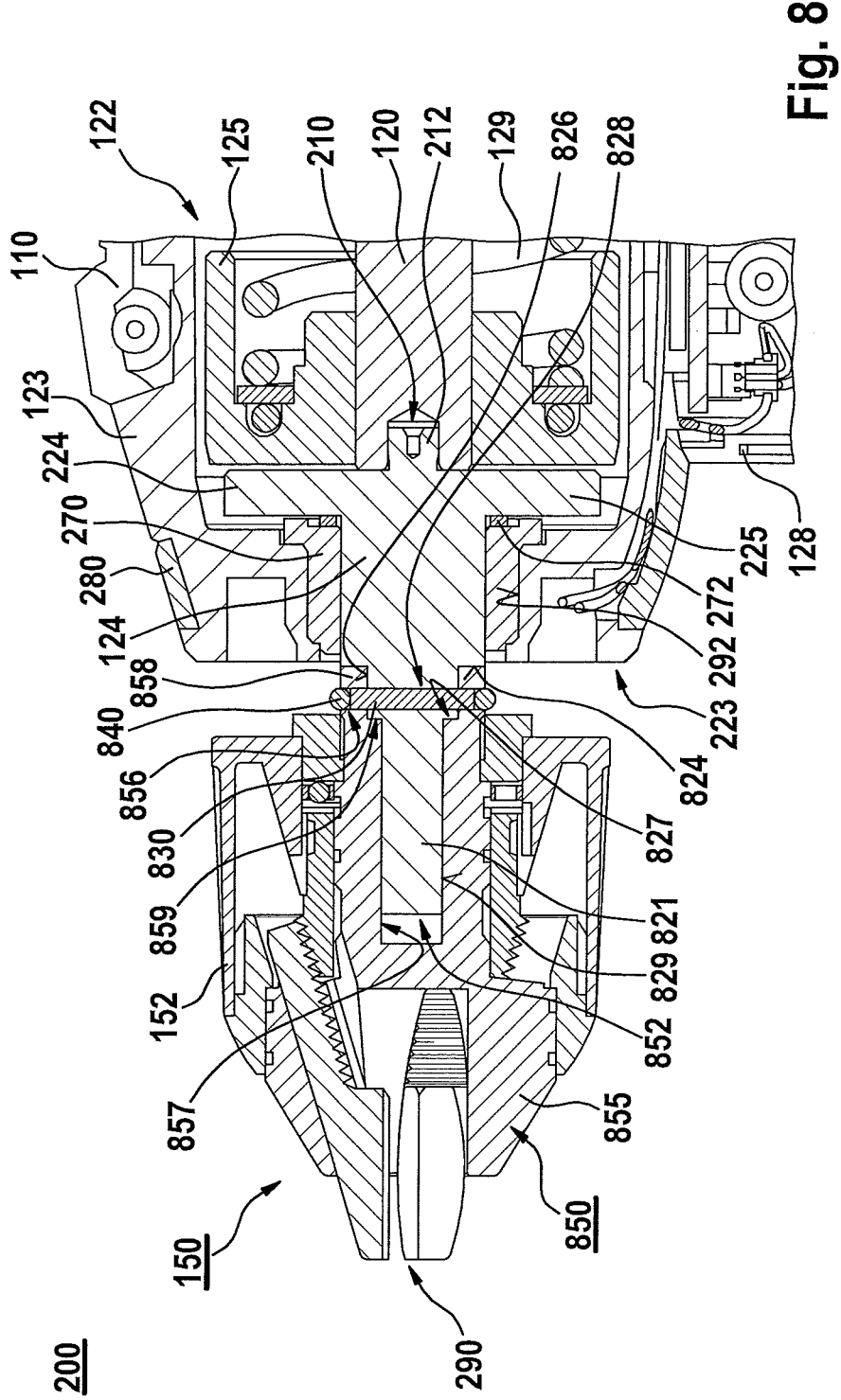
FIG. 8 is a sectioned view of the portion of the impact driver of FIG. 1 having a tool receptacle according to a fourth embodiment.

FIG. 8 shows portion 200 of impact driver 100 of FIG. 1 with an exemplifying clamping chuck 850 which is connected to output drive shaft 124 of FIG. 1 and with which clamping chuck 150 of FIG. 1 can be implemented in accordance with a fourth embodiment. Here output drive shaft 124, similarly to the case in FIGS. 2 and 3, is embodied in one piece and is equipped with output drive cams 224, 225 and with at least one, for example, radial passthrough opening 828. Output drive shaft 124 can furthermore embody a rotationally entraining member 821.

Rotationally entraining member 821 is illustratively embodied in a first tapered region 826 of output drive shaft 124, in which region output drive shaft 124 transitions from output drive cams 224, 225 to a first shoulder 824. Radial passthrough opening 828 is also provided, by way of example, in this first tapered region 826. In addition, first tapered region 826 in turn tapers at a second shoulder 827 into a second tapered region 829 in which, by way of example, rotationally entraining member 821 is embodied, for example in the manner of a polygonal external contour, for rotational entrainment of clamping chuck 850.

Clamping chuck 850 illustratively has a clamping chuck body 855 on whose axial end facing toward impact mechanism housing 123 is embodied a fastening portion 858 in which is provided a radial opening 856 oriented in alignment with radial passthrough opening 828 of output drive shaft 124. Fastening portion 858 illustratively closes off an internal recess 852 that is provided on clamping chuck body 855 and widens in the region of an annular shoulder 859 into fastening portion 858. Internal recess 852 is equipped by way of example with a rotationally entrained member 857 into which rotationally entraining member 821, embodied on output drive shaft 124, engages in rotationally secured fashion. Output drive shaft 124 can thereby be pressed into clamping chuck body 855 in order to stabilize the connection.

Rotationally entraining member 821 is embodied, for example, in the manner of a polygonal external contour on the external periphery of second tapered region 829, and rotationally entrained member 857 is embodied, for example, in the manner of a polygonal internal contour in internal recess 852. Rotational entrainment of clamping chuck body 855 and thus of clamping chuck 850 by output drive shaft 124 can thus be brought about by way of a positive engagement embodied between rotationally entraining member 821 and rotationally entrained member 857.

For rotationally secured fastening of clamping chuck body 855 on output drive shaft 124, an at least locally peg-shaped securing member 830, which will be referred to hereinafter also as a "securing pin" in order to simplify the description, is disposed illustratively in radial passthrough opening 828 of output drive shaft 124 and at least locally in radial opening 856 of clamping chuck body 855. Securing pin 830 can, for example, be pressed into openings 828, 856 or clamp-locked therein, and/or can have an angled portion in order to prevent securing pin 830 from undesirably falling out of openings 828, 856 in the context of installation of clamping chuck 850 on output drive shaft 124.

In addition, an O-shaped securing ring 840 is disposed in the region of securing pin 830, for example on clamping chuck body 855, in order to immobilize securing pin 830 in radial opening 856 of clamping chuck 855 and in radial passthrough opening 828 of output drive shaft 124. This securing ring 840, embodied e.g. from an elastic polymer, fits around output drive shaft 124 and around fastening portion 858 of clamping chuck body 855 in the region of securing pin 830 so as thereby to prevent securing pin 830 from undesirably falling out of openings 828, 856.

Be it noted that clamping chuck 850 as well illustratively encompasses clamping sleeve 152 as well as clamping jaws 290 of FIG. 2. Further characterization of individual components of clamping chuck 850 has, however, as also in the case of clamping chuck 250 of FIG. 2, been omitted in the interest of a simple and comprehensible drawing.

Figure 9:
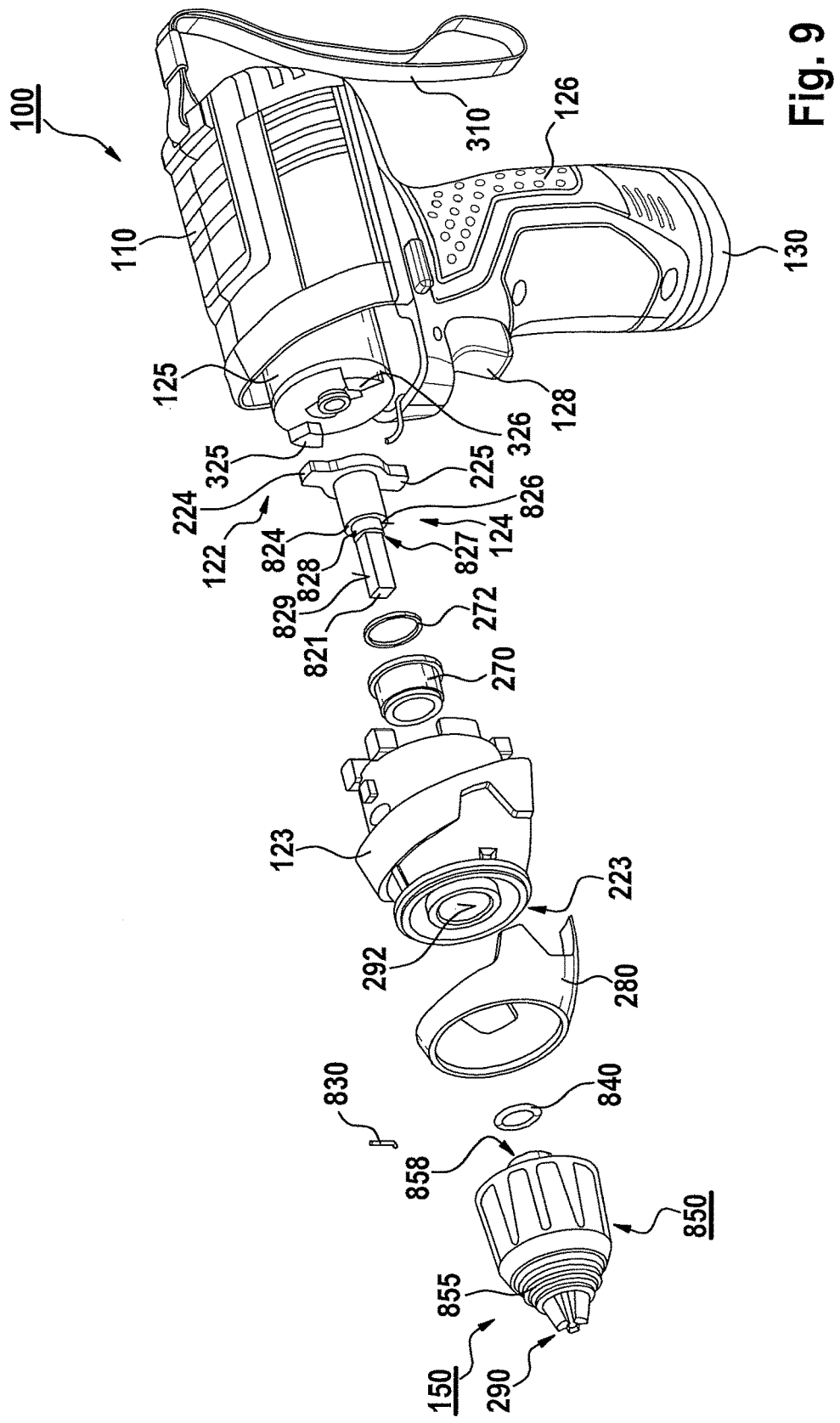
FIG. 9 is a perspective exploded view of the impact driver of FIG. 1 equipped with the tool receptacle of FIG. 8.

FIG. 9 shows impact driver 100 of FIG. 1, equipped with clamping chuck 850 of FIG. 8, in the context of an exemplifying installation of clamping chuck 850 on impact driver 100, in particular in order to elucidate an exemplifying embodiment of output drive shaft 124 embodied in one piece, and of securing pin 830 and securing ring 840.

What is claimed is:

1. An impact driver, comprising:
an impact mechanism for rotary percussive driving of an output drive shaft on which is provided a tool receptacle for receiving an inserted tool,
wherein the tool receptacle is a clamping chuck, a permanent connection being embodied between the clamping chuck and the output drive shaft to prevent at least tool-free detachment of the clamping chuck from the output drive shaft,
wherein the impact mechanism includes a mechanical impact mechanism having a spring-loaded impact member having at least one input drive cam, and
wherein the output drive shaft is embodied in at least two pieces and has an output drive stud and a cam member having at least one output drive cam, the output drive stud being fastened nonrotatably via a rigid connection on the clamping chuck and being connected nonrotatably and in an axially fixed manner to the cam member.

2. The impact driver of claim 1, wherein the output drive stud has, at an axial end thereof connected to the cam member, a rotationally entrained member that engages, in a rotationally secured manner, a rotationally entraining member correspondingly embodied on the cam member.

3. The impact driver of claim 1, wherein the cam member is fastened on the output drive stud via a securing member.

4. The impact driver of claim 3, wherein the securing member is disposed on a side of the cam member facing away from the impact member.

5. An impact driver, comprising:
an impact mechanism for rotary percussive driving of an output drive shaft on which is provided a tool receptacle for receiving an inserted tool,
wherein the tool receptacle is a clamping chuck, a permanent connection being embodied between the clamping chuck and the output drive shaft to prevent at least tool-free detachment of the clamping chuck from the output drive shaft,
wherein the impact mechanism includes a mechanical impact mechanism having a spring-loaded impact member having at least one input drive cam,
wherein the output drive shaft is embodied in at least two pieces and has an output drive stud and a cam member having at least one output drive cam, the output drive stud being fastened nonrotatably via a rigid connection on the clamping chuck and being connected nonrotatably and in an axially fixed manner to the cam member,
wherein the cam member is fastened on the output drive stud via a securing member, and
wherein the securing member is disposed on a side of the cam member facing toward the impact member.

6. The impact driver of claim 1, wherein the output drive stud tapers at a shoulder abutting against the cam member.

7. An impact driver, comprising:
- an impact mechanism for rotary percussive driving of an output drive shaft on which is provided a tool receptacle for receiving an inserted tool,
- wherein the tool receptacle is a clamping chuck, a permanent connection being embodied between the clamping chuck and the output drive shaft to prevent at least tool-free detachment of the clamping chuck from the output drive shaft,
- wherein the impact mechanism includes a mechanical impact mechanism having a spring-loaded impact member having at least one input drive cam,
- wherein the output drive shaft is embodied in at least two pieces and has an output drive stud and a cam member having at least one output drive cam, the output drive stud being fastened nonrotatably via a rigid connection on the clamping chuck and being connected nonrotatably and in an axially fixed manner to the cam member,
- wherein the output drive stud has, at an axial end thereof connected to the cam member, a rotationally entrained member that engages, in a rotationally secured manner, a rotationally entraining member correspondingly embodied on the cam member, and
- wherein the rotationally entrained member is embodied as a polygonal contour on an external periphery of the output drive stud, and the rotationally entraining member is provided as a polygonal opening on the cam member.

8. The impact driver of claim 5, wherein the securing member is embodied as a securing ring that is disposed in an annular groove provided on the output drive stud.

* * * * *